United States Patent [19]

Foster et al.

[11] Patent Number: 4,895,885

[45] Date of Patent: Jan. 23, 1990

[54] POLYMER COMPOSITIONS STABILIZED WITH POLYSILOXANES CONTAINING STERICALLY HINDERED HETEROCYCLIC MOIETY

[75] Inventors: George N. Foster, Bloomsbury, N.J.; Herbert E. Petty, Bethel, Conn.; Roswell E. King, III, Pleasantville, N.Y.

[73] Assignee: Union Carbide Chemicals and Plastics Company Inc., Danbury, Conn.

[21] Appl. No.: 240,739

[22] Filed: Sep. 6, 1988

[51] Int. Cl.$^4$ ............................................. C08K 5/34
[52] U.S. Cl. .................................... 524/99; 524/100; 524/104; 524/106; 524/188; 528/27; 528/28; 546/14; 548/110; 548/406; 544/229
[58] Field of Search ...................... 546/14; 528/27, 28; 548/406, 110; 544/229; 524/99, 100, 104, 106, 188

[56] References Cited

U.S. PATENT DOCUMENTS

| | | | |
|---|---|---|---|
| 2,865,918 | 12/1958 | Hurwitz et al. | 548/406 |
| 2,881,184 | 4/1959 | Pike | 548/406 |
| 4,535,113 | 8/1985 | Foster et al. | 524/262 |

OTHER PUBLICATIONS

Dagonneau, et al., "Sterically Hindered Amines and Nitroxyls as Polymer Stabilizers", Rev. Macromol. Chem. Phys., C22(2), 169–203 (1982–1983).

Primary Examiner—Melvyn I. Marquis
Attorney, Agent, or Firm—E. C. Trautlein

[57] ABSTRACT

The present invention relates to olefin polymers stabilized with polysiloxanes containing sterically hindered heterocyclic moieties, said polysiloxanes represented by the general formula $M^*_y D_x D^*_y T_z Q_w M^*_y$.

47 Claims, No Drawings

POLYMER COMPOSITIONS STABILIZED WITH POLYSILOXANES CONTAINING STERICALLY HINDERED HETEROCYCLIC MOIETY

FIELD OF THE INVENTION

The present invention is directed to stabilized olefin polymer compositions in which the stabilizer is a polysiloxane containing the pendant sterically hindered aminoheterocyclic moiety attached to the siloxane chain; such as the sterically hindered piperidinoxy polysiloxane represented by the general formula:

$$M_v{}^*D_xD_y{}^*T_zQ_wM_v{}^*$$

BACKGROUND

A common problem encountered with natural and synthetic materials, particularly synthetic organic polymers, is their instability on exposure to light, atmospheric conditions and elevated temperatures, as well as the adverse effects exerted on the polymers by the minute amounts of catalyst residues often present in the synthetic polymers, which frequently lead to physical deterioration and color change. Over the years industry has resorted to the addition of a wide variety of antioxidants, ultraviolet light absorbers and heat stabilizing agents to the polymers but there is still exerted a continuing effort to find new materials that will accomplish the same or improved objectives without affecting other properties that may have a deleterious effect on manufacturing and processing operations. It is also known in industry that a compound that stabilizes against heat and/or oxygen degradation may not stabilize against light degradation in the same material, and vice versa. It is further known that a compound which exerts some form of stabilization in one type of material may be completely ineffective in another type of material. Thus, compounds are classified as antioxidants, light stabilizers, heat stabilizers, etc., depending upon the stabilizing effect a particular compound may have on a specific material or type of material. As a consequence, in many cases, mixtures of stabilizers are used to obtain desired protection against one or more forms of degradation.

In Rev. Macromal. Chem. Phys., C22(2), 169–203 (1982–1983), Dagonneau et al. published a review "Sterically Hindered Amines and Nitroxyls as Polymer Stabilizers" which includes conventional piperidine compounds among the stabilizers disclosed. However, none of the sterically hindered amines are silicon-based.

U.S. Pat. No. 4,535,113, issued to G. N. Foster et al. on Aug. 13, 1985, discloses the use of certain silicone compounds as additives to olefin polymers. Among the silicone compounds are the alkylaminosiloxy-containing materials as exemplified in Examples 7 to 10. However, there is no mention of any sterically hindered heterocyclic amines of the type used in this invention.

It has now been found that certain polysiloxanes containing a pendant sterically hindered aminoheterocyclic moiety attached to the siloxane chain stabilize synthetic polymers, particularly synthetic olefin polymers, against the deleterious effects caused by exposure to light and heat.

SUMMARY OF THE INVENTION

The present invention is directed to polymer compositions stabilized with a stabilizing amount sufficient to stabilize said compositions of a polysiloxane of the generally formula:

$$M_v{}^*D_xD_y{}^*T_zQ_wM_v{}^* \qquad (I)$$

said polysiloxane containing a pendant sterically hindered amine moiety attached to the siloxane chain by a linking group.

DESCRIPTION OF THE INVENTION

The olefin polymers have become one of the major industrial products manufactured, the amount produced annually running in the multi-billions of pounds. They vary in composition from polymers consisting essentially of a single polymerized hydrocarbon olefin having two or more carbon atoms in the monomer molecule, e.g., ethylene or propylene, to polymers containing two or more polymerized olefins, to polymers of such olefins modified with one or more copolymerizable monomers that can be monounsaturated or polyunsaturated. Illustratively, such comonomers include propene, isoprene, the butenes, butadiene, the pentenes, hexenes, heptenes and octenes, styrene, as well as many other polymerizable hydrocarbon monomers. Also included are monomers such as the polymerizable unsaturated monomers containing other atoms, such as acrylic and methacrylic acid; acrylonitrile and methacrylonitrile; the esters such as vinyl acetate and the acrylate and methacrylate esters, methyl acrylate, methyl methacrylate, 2-ethylhexyl acrylate, and the like; the ethers such as vinyl ethyl ether, and the like; the ketones such as vinyl ethyl ketone and the like; as well as hosts of other alpha olefinically unsaturated monomers known to those skilled in the art of olefin homopolymers and copolymers.

It is also known that the olefin polymers have a wide variety of properties. They can be liquids, solids, rubbers, linear, branched, rigid, flexible, crosslinked, etc. They also vary in the amount of hydrocarbon olefin polymerized in the molecules from polyolefins that are 100 percent hydrocarbon olefin, e.g. polyethylene and polypropylene, to polymers in which the hydrocarbon olefin polymerized in the molecule can be as low as about 60 weight percent with the balance comprising one or more of the other types of comonomers. Regardless of their composition, the stabilizers of this invention have been found to have a stabilizing effect on the olefin polymers. For the purpose of this invention the term "olefin polymer" signifies a polymer which contains about 60 weight percent or more polymerized hydrocarbon olefin(s) in the polymer molecule as well as blends of olefin polymers with one another or with other polymers. These polymers are well known in the art and many are commercially available.

Illustrative of olefin polymers one can mention the normally solid polymers including the homopolymers of olefins as well as interpolymers of one or more olefins with each other and/or up to about 30 percent by weight of one or more monomers which are copolymerizable with such olefins; homopolymers and interpolymers of such olefins as ethylene, propylene, butene-1, isobutylene, hexene-1, 4-methyl-pentene-1, pentene-1, octene-1, nonene-1, decene-1, as well as interpolymers of one or more of such olefins and one or more of other monomers which are interpolymerizable with such alpha-olefins, such as vinyl and diene compounds, and the like.

Exemplary interpolymers are the ethylene copolymers such as ethylene-propylene copolymers, ethylene butene-1 copolymers, ethylene hexene 1 copolymers, ethylene-octene-1 copolymers, polymers of ethylene and two or more of the following compounds: propylene, butene-1, hexene-1, 4-methyl-pentene-1, octene-1, butadiene, dicyclopentadiene, hexadiene, ethylidene norbornene and the like.

Also included in the term olefin polymer are blends of one polymer with one or more other polymers. Illustrative of such blends are the olefin polymers with one or more of the following: polypropylene, high pressure polyethylene, low-density polyethylene, high density polyethylene, polybutene-1 and a polar monomer, olefin copolymers such as ethylene/acrylic acid copolymers, ethylene/methyl acrylate copolymers, ethylene/ethyl acrylate copolymers, ethylene/vinyl acetate copolymers, ethylene/acrylic acid/ethyl acrylate terpolymers, acrylonitrile-butadiene-styrene polymers, ethylene/acrylic acid/vinyl acetate terpolymers, and the like, as well as the salts thereof, e.g., the inomers.

Particularly preferred ethylene polymers for purposes of this invention are low pressure, substantially linear ethylene homopolymers and ethylene $C_3$ to $C_8$ alpha olefin interpolymers having a density of about 0.85 to about 0.97, preferably about 0.875 to about 0.93. These interpolymers can be prepared by reacting a mixture containing about 50 to 99.9 mole percent, preferably about 75 to 96 mole percent ethylene, and from about 0.1 to 50 mole percent and preferably about 4 to about 25 mole percent of one or more $C_3$ to $C_8$ alpha olefins such as propylene, butene-1, pentene-1, 4-methyl-pentene-1, hexene-1, heptene-1, octene-1, and the like, or a diolefin using a magnesium chloride/titanium chloride catalyst and employing low pressures on the order of about 15 to 300 psi as disclosed in U.S. Pat. No. 4,302,565. Other processes are known in which the catalyst can be a transition metal compound, e.g. chrominum oxide, as well as any of the known Ziegler and Natta catalytic processes.

The discovery that the liquid to solid polysiloxanes of formula (I) have a stabilizing effect on olefin polymers was completely surprising and unexpected. The polysiloxanes of formula (I) useful as stabilizers contain the sterically hindered moiety, and have the general formula:

$$M_v{}^*D_xD_y{}^*T_zQ_wM_v{}^* \qquad (I)$$

These polysiloxanes (I) have recurring groups of both the D unit and the D* unit in the polysiloxane chain, the units being represented by the formulas shown below, in which the sterically hindered heterocyclic moiety is attached to the silicon atom of the D* unit of the siloxane chain by a connecting link.

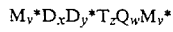

-continued

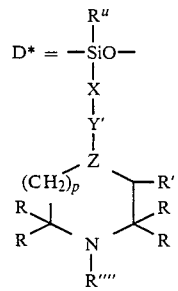

wherein R is phenyl or a lower alkyl group having from 1 to 3 carbon atoms, preferably methyl; R' is hydrogen or a lower alkyl group having 1 to 3 carbon atoms, or a keto oxygen (=O), preferably hydrogen; and X is nothing or a divalent linking group such as —$C_nH_{2n}$—, —$C_nH_{2n}$—O—$C_mH_{2m}$—, —$C_nH_{2n}$—O—$C_mH_{2m-1}(OH)$—, wherein n has a value of from 0 to about 10, preferably 3 and m has a value of from 0 to about 10; Y' is —O— or —COO— or —NH— or —$C_nH_{2n}$O—; Z is a carbon or nitrogen atom, with the proviso that when Z is nitrogen Y' is —$C_nH_{2n}$O—; p has a value of zero or one; $R^u$ is an alkyl group having from 1 to about 8 carbon atoms, preferably from 1 to 3 carbon atoms, phenyl or phenethyl; and R'''' is hydrogen or alkyl having from 1 to about 12 carbon atoms.

For the sake of simplicity the heterocyclic moiety is hereby designated by the symbol Y, and Y represents the group:

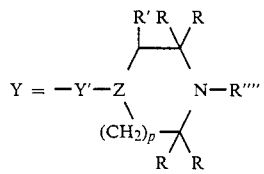

The piperidinoxy group is herein designated by the symbol Y''', and Y''' represents the group:

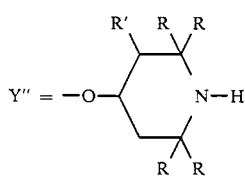

The polysiloxane chain also contains terminal units that can be either M, M' or M'' units these units being represented by the formulas:

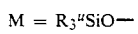
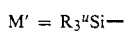
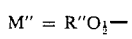

wherein R'' is an alkyl group having from 2 to about 40 carbon atoms, preferably from about 12 to about 18 carbon atoms; or a phenyl group, unsubstituted or substituted, linear or branched.

As is known the substituents on a single silicon atom need not all be the same. Thus, they can all be methyl groups or they can be a combination of two or more alkyl groups or other of the groups heretofore defined.

The polysiloxane chain can also contain any of the other siloxane units known to those skilled in the art.

Included among the polysiloxanes of this invention are the branched or star-type polymers that contain either the T unit or the Q unit, or both, in the polysiloxane chain, these units being represented by the formulas:

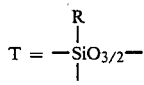

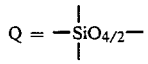

The polysiloxanes of this invention containing the sterically hindered heterocyclic moiety can be represented by the general formula:

$$M_v*D_xD_y*T_zQ_wM_v* \quad (I)$$

wherein

M* represents the M, M' and M'', units;

v has a value of 1;

x has a value of from 0 to about 200, preferably from 1 to about 20;

y has a value of from 1 to about 100, preferably from 1 to about 20;

z has a value of from zero to about 5, preferably zero;

w has a value of from zero to about 5, preferably zero; and

D, D*, T and Q are as heretofore defined.

Subgenerically the polysiloxanes (I) can be represented by the formulas:

$$MD_xD_y*T_zQ_wM' \quad (IIA)$$

$$M''D_xD_y*T_zQ_wM'' \quad (IIB)$$

The preferred polysiloxanes (I) are those represented by the formulas:

$$MD_xD_y*M' \quad (IIIA)$$

$$M''D_xD_y*M'' \quad (IIIB)$$

and the most preferred are those in which all of the R groups in the M, M', D, D* and M'' moieties are methyl groups.

Illustrative typical polysiloxane polymers of this invention are listed in Table I. In this table the numerals below the siloxane units identified in the heading indicate the average number of each such unit in the polymer chain, keeping in mind, as is known in the art, that all of a specifically identified unit need not necessarily be confined to a single segment in the polymer molecule.

TABLE I

| M | M'' | D | D* | T | Q | M'' | M' |
|---|-----|---|----|----|----|-----|----|
| 1 | 0 | 0 | 1 | 0 | 0 | 0 | 1 |
| 0 | 0 | 0 | 4 | 0 | 0 | 0 | 0 |
| 1 | 0 | 15 | 5 | 0 | 0 | 0 | 1 |
| 1 | 0 | 10 | 5 | 0 | 0 | 0 | 1 |

TABLE I-continued

| M | M'' | D | D* | T | Q | M'' | M' |
|---|-----|---|----|----|----|-----|----|
| 1 | 0 | 5 | 5 | 0 | 0 | 0 | 1 |
| 0 | 1 | 0 | 4 | 0 | 0 | 1 | 0 |
| 0 | 1 | 4 | 4 | 0 | 0 | 1 | 0 |
| 1 | 0 | 5 | 9 | 0 | 0 | 0 | 1 |
| 1 | 0 | 0 | 10 | 0 | 0 | 0 | 1 |
| 1 | 0 | 10 | 10 | 0 | 0 | 0 | 1 |
| 1 | 0 | 5 | 10 | 0 | 0 | 0 | 1 |
| 1 | 0 | 5 | 15 | 0 | 0 | 0 | 1 |
| 1 | 0 | 15 | 15 | 1 | 0 | 0 | 2 |
| 1 | 0 | 20 | 20 | 0 | 1 | 0 | 3 |

Illustratively, the polysiloxanes are conveniently produced by the catalytic reaction of a hindered piperidinol with a siloxane having a reactive hydrogen atom attached to a silicon atom via a dehydrocondensation reaction; the siloxane has ≡Si—H groups in the molecule. This reaction is known and it is also known that the transition metals are suitable catalysts and that they are generally used in the form of transition metal compounds such as cycloocta-1,5-diene diiodoplatinum (II), H₂PtCl₆·6H₂O, bis-triphenylphosphine platinum diiodide, bis-triphenylphosphine carbonyl iridium (I) chloride, bis-triphenylphosphine carbonyl rhodium (I) chloride, palladium acetylacetonate, and the like. Any catalytic amount sufficient to catalyze the dehydrocondensation reaction can be used, e.g., from about 50 ppm or less to about 1,000 ppm or more transition metal atom, preferably from about 100 ppm to about 500 ppm, most preferably from about 150 ppm to about 300 ppm, based on the amount of polysiloxane starting material.

In addition any of the other known processes for reacting a hydrosilane with a functional hydroxyl group or oxirane group can be used. Such processes are discussed in the literature, for example, B. Boyer et al., J. Organomet. Chem., 148 (1978) C1–C4 and J. Organomet Chem., 157 (1978) 153–162; Blackburn et al., J. Organomet. Chem., 192 (1980) 329–338.

In the reaction an inert solvent is used, such as xylene, mesitylene, or higher alkane. The solvent preferably has a boiling point above 125° C., and most preferably above about 135° C. The solvent is subsequently removed by distillation or desolvation techniques. The reaction is generally carried out at reflux temperature in the presence of the catalyst.

An alternative process involves the anionic base catalyzed dehydrocondensation of the piperidinol with the ≡Si—H containing siloxane as shown in Example 14.

The hindered heterocyclic amines used as starting materials for the production of the compounds of Formula (I) are represented by the general formula:

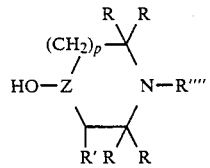

wherein R, R', R'''' and Z are as previously defined. Illustrative thereof one can mention 2,2,6,6-tetramethyl-4-piperidinol, 2,2,3,6,6-pentamethyl-4-piperidinol, 1,2,2,6,6-pentamethyl-4-piperidinol, N-(2-methylpropane-1-ol)-3,3,5,5-tetramethyl-2-piperazi none, 2,2,3,5,5-pentamethyl-4-methylolpyrrolidine, and the like.

The ≡Si—H containing siloxane starting materials that are reacted with the hindered amines (IV) to produce the polysiloxanes (I) can be represented by the general formula:

$$M^*D_xD_y'T_zQ_wM^* \quad \text{(V)}$$

Subgenerically the ≡Si—H containing siloxanes (V) can be represented by the formulas:

$$MD_xD_y'T_zQ_wM' \quad \text{(VIA)}$$

$$M''D_xD_y'T_zQ_wM'' \quad \text{(VIB)}$$

The preferred ≡Si—H containing siloxanes (V) are those represented by the formulas:

$$MD_xD_y'M' \quad \text{(VIIA)}$$

$$M''D_xD_y'M'' \quad \text{(VIIB)}$$

and the most preferred are those in which all of the R groups in the M, D, D' and M' moieties are methyl groups.

In Formulas V, VIA, VIB, VIIA and VIIB the M*, M, M', M'', D, T, Q, x, y, z and w symbols have the same meanings herebefore defined and the D' unit represents the following:

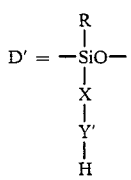

wherein R, Y' and X are as hereinbefore defined.

Illustrative typical Si—H containing silicone starting materials are listed in Table II.

TABLE II

| M | M'' | D | D' | T | Q | M''' | M' |
|---|---|---|---|---|---|---|---|
| 1 | 0 | 0 | 1 | 0 | 0 | 0 | 1 |
| 0 | 0 | 0 | 0 | 0 | 0 | 0 | 0 |
| 1 | 0 | 15 | 5 | 0 | 0 | 0 | 1 |
| 1 | 0 | 10 | 5 | 0 | 0 | 0 | 1 |
| 1 | 0 | 5 | 5 | 0 | 0 | 0 | 1 |
| 0 | 1 | 0 | 4 | 0 | 0 | 1 | 0 |
| 0 | 1 | 4 | 4 | 0 | 0 | 1 | 0 |
| 1 | 0 | 5 | 9 | 0 | 0 | 0 | 1 |
| 1 | 0 | 0 | 10 | 0 | 0 | 0 | 1 |
| 1 | 0 | 10 | 10 | 0 | 0 | 0 | 1 |
| 1 | 0 | 5 | 10 | 0 | 0 | 0 | 1 |
| 1 | 0 | 5 | 15 | 0 | 0 | 0 | 1 |
| 1 | 0 | 15 | 15 | 1 | 0 | 0 | 2 |
| 1 | 0 | 20 | 20 | 0 | 1 | 0 | 3 |

The ≡Si—H containing compounds represented by Formula (V) are known materials and a specific procedure for preparation is set forth in Example 2 of U.S. Pat. No. 4,046,930 granted Sept. 6, 1977.

The polysiloxanes represented by Formula (I) containing the sterically hindered heterocyclic amine moiety are herein used as additives in olefin polymers either as antioxidants and/or heat stabilizers and/or light stabilizers.

In addition to the above-defined compounds of formula (V) it was also found that the tetralkylcyclotetrasiloxanes of the average general formula:

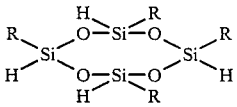

react with the sterically hindered heterocyclic amines to produce the polysiloxanes of the average general formula:

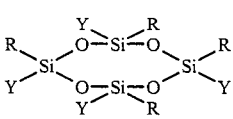

The amount of stabilizer polysiloxane containing the sterically hindered heterocyclic moiety represented by formula I that is added to the olefin polymer is an amount sufficient to exert a stabilizing effect on the polymer. This amount can vary from about 0.005 percent to about 2 percent, preferably from about 0.01 to about 0.5 percent, most preferably from about 0.05 percent to about 0.3 percent, based on the weight of the olefin polymers.

In addition there can also be added any of the known stabilizing agents as costabilizers, antioxidants, fillers, pigments, lubricants, slip agents, antiblock agents, as well as any of the other additives previously known as suitable for use with olefin polymers. These materials and the concentrations at which they are used are well known to those skilled in this art with e.g. silica, calcium carbonate, carbon black, talc and titanium dioxide being a few representative examples thereof.

The preparation of the stabilized olefin polymer composition can be carried out by any suitable means, for example, by fluxing the olefin polymer with the stabilizer on heated rolls, by the use of a Banbury mixer or of heated extruders, and the like. The equipment and procedures are well established in the art.

The following examples serve to further illustrate the invention. Parts are by weight unless otherwise specified.

EXAMPLE 1

Several sterically hindered piperidinoxy polysiloxanes were prepared as described in the subsequent experiments and were evaluated as UV stabilizers in olefin polymers. The test samples were prepared by initially preparing separate masterbatches of each stabilizer composition with a virgin ethylene/1-butene copolymer produced by the catalytic process disclosed in U.S. Pat. No. 4,508,842 (Polyolefin A). Each masterbatch contained the selected polysiloxane as stabilizer at a concentration of 5 weight percent.

Portions of each masterbatch were used to prepare the olefin polymer compositions for evaluation; this procedure provided for more accurate addition of the desired amount of stabilizer to the olefin polymer. An accurately weighed amount (10 g) of the stabilizer was added to a weighed amount (2,270 g) of the olefin polymer to provide a total concentration of 1,000 ppm of the stabilizer in the blend. Each mixture was mixed for five minutes to ensure thorough mixing and dispersion and then extruded using a Brabender Plasticorder ® extruder fitted with a one inch diameter extruder screw, a 25:1 length/diameter ratio and a 2 inch by 0.125 inch tape die. All zones of the extruder, including the die, were heated to 180° C. prior to the performance of the balance of the procedure.

The extruder was purged for 10 minutes at 50 rpm with an additional quantity of the virgin, non-stabilized olefin polymer and this was followed by introduction of the stabilized olefin polymer composition prepared above. The stabilized olefin polymer composition was extruded for a period of 5 minutes and collected as a 0.125 inch thick tape. The extruder was then purged with an additional quantity of the virgin, non-stabilized olefin polymer followed by the subsequent batch of stabilized copolymer composition. This alternating procedure was repeated for the preparation of the tapes for each stabilized olefin polymer composition.

Additive 5 - glycerol monostearate
Additive 6 - sorbital monostearate
Additive 7 - Dimethyl succinate polymer with 2,2,6,6-tetramethyl-1-piperidineethanol Yellowness Index was determined in accordance with ASTM D-1925-70, before and after aging at 60° C. for 4 weeks. A Pacific Scientific Colorgard System ®/05 instrument was used in determination of the color Melt Index, Flow Index and Melt Flow Ratio represent the melt viscosity of the polyolefin at a prescribed temperature under various pressure in accordance with ASTM D-1238 conditions E and F. Data was collected with the aid of a Tinius-Olsen Plastograph ®

TABLE III

EXAMPLE 1

| Blend Run | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| PS-A | 1000 | | | | | | | 1000 | | | | | | |
| PS-B | | 1000 | | | | | | | | | | | | |
| PS-C | | | 1000 | | | | | | | | | | | |
| PS-D | | | | 1000 | | | | | | | | | | |
| PS-E | | | | | 1000 | | | | | | | | | |
| PS-F | | | | | | 1000 | | | | | | | | |
| PS-G | | | | | | | | | 1000 | | | | | |
| PS-H | | | | | | | | | | 1000 | | | | |
| PS-I | | | | | | | | | | | 1000 | | | |
| Add. 1 | | | | | | | | | | | | 300 | 300 | 300 |
| Add. 2 | | | | | | | | | | | | 500 | 500 | 500 |
| Add. 3 | | | | | | | | | | | | | 600 | |
| Add. 4 | | | | | | | | | | | | 500 | 500 | 500 |
| Hrs. HV Expito 50% Retained Elongation | 350 | 280 | 235 | 225 | 175 | 390 | 325 | 385 | 430 | 290 | 35 | 35 | 35 | 35 |

Add. = Additive
Amounts of polysiloxane and additive are given in ppm.

The tape extrudates were pressed at 165° C. to form 6 inch by 6 inch by 0.025 inch thrck plaques and each plaque was cut in half to form 3 inch by 6 inch by 0.025 inch thick samples that would fit into the holder on the Weatherometer. Eight such samples for each stabilized olefin polymer composition were prepared and they were exposed to repeating cycles of 8 hours exposure to UV light at 60° C. and 4 hours exposure to condensation at 40° C. using the procedure described in ASTM D 4329-84. The percent elongation was measured after various periods of exposure and from these values the 50 percent retained elongation was calculated.

For comparative purposes the same olefin polymer was tested without additives and with conventional, heretofore available additives.

The results for Example 1 on the stability of Polyolefin A are shown in Table III; the materials used were:

Polyolefin A - a ethylene/1-butene olefin polymer of U.S. Pat. No. 4,508,842 described supra.
PS-A - a polysiloxane of Experiment 9 structure.
PS-B - a polysiloxane of Experiment 10 structure.
PS-C - a polysiloxane of Experiment 11 structure.
PS-D - a polysiloxane of Experiment 12 structure.
PS-E - a polysiloxane of Experiment 13 structure.
PS-F - a polysiloxane of Experiment 15 structure.
PS-G - a polysiloxane of Experiment 16 structure.
PS-H - a polysiloxane of Experiment 17 structure.
PS-I - a polysiloxane of Experiment 18 structure.
Additive 1 - octadecyl 3 (3,5 di-tert-butyl-4-hydroxyphenyl)propionate.
Additive 2 - zinc stearate.
Additive 3 - tris-(2,4-di tert-butylphenyl) phosphite.
Additive 4 - N-N-2 hydroxyethylstearyl amine Runs 1 to 10 contained 1,000 ppm of the polysiloxanes stabilizer blended with Polyolefin A. Table III reports the hours of UV exposure to 50% retained elongation.

EXAMPLE 2

An ethylene/hexene-1 olefin polymer (0.30 MI; 0.92 gm/cc density; melt flow ration (MFR) of 86) containing 8.5 ppm vanadium residue from the catalyst was blended essentially as previously described with various stabilizers at the concentration in ppm shown in Table IV. These blends were extruded at 250° C. at 50 rpm using a 4 inch tape die. The extruded film tape was pressed at 175° C. to form a 125 mil plaque and the colors were compared to determine the heat stability properties of the various blends. The blend of this invention containing the polysiloxane stabilizer (Run 5) showed significantly higher heat stability than the blends of the comparative runs (Runs 1 to 4) containing known conventional stabilizers alone.

TABLE IV

| Run | 1 | 2 | 3 | 4 | 5 |
|---|---|---|---|---|---|
| Add. 1 | 500 | 500 | 500 | 500 | 500 |
| Add. 2 | 1000 | 500 | 500 | 500 | 500 |
| Add. 5 | | | 500 | | |
| Add. 6 | | | | 500 | |
| Add. 7 | | | | 300 | |
| PS-B | | | | | 500 |
| Yellowness Index (4 wks @ 60° C.) | 6.2 | 11 | 13 | 28 | 4.0 |

TABLE IV-continued

| Run | 1 | 2 | 3 | 4 | 5 |
|-----|----|----|----|-----|----|
| MFR | 90 | 94 | 86 | 8.4 | 88 |

Add. = Additive
Amounts of Additives and PS-B are in ppm based on olefin polymer The following experiments serve to illustrate the preparation of the polysiloxane stabilizers. In the experiments a nitrogen purge was used during the reaction.

Experiment 1

A 50 ml 3 neck round bottom flask was fitted with a condenser, thermometer, magnetic stirrer and fittings for introducing a nitrogen atmosphere and was charged with 7.07 g of $MD_y'M_n'$ of the structure:

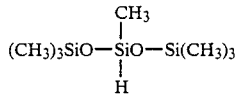

5 g of 2,2,6,6-tetramethyl-4,-piperidinol, 10 g of xylene and 5.13 mg of cycloocta-5-diene diiodoplatinum (II) (35% Pt), equivalent to 254 ppm Pt based on siloxane. The reaction mixture was heated for four hours at reflux, small amounts of activated charcoal and filter aid were added, the mixture was cooled and filtered to yield a clear brown liquid. This was then vacuum stripped to yield 7.2 g of a clear brown liquid. Yield was about 60% of theory of the polysiloxane containing the sterically hindered 2,2,6,6-tetramethyl-4-piperidinoxy moiety (PIP) having the formula $MD^*M'$ wherein all of the R groups in the molecules are methyl groups, y has an average value of about 1, and X was nothing. The 2,2,6,6-tetramethyl-4-piperidinoxy moiety herein identified as PIP, has the structure:

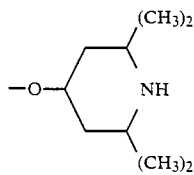

and has replaced the hydrogen atom of the

group in the polysiloxane molecule.

Experiment 2

To the reactor described in Experiment 1 there were added 3.44 g of 1,3,5,7-tetramethylcyclotetrasiloxane, 9 g of 2,2,6,6-tetramethyl-4-piperidinol, 10 g of xylene and 2.82 mg of the same platinum catalyst used in Experiment 1 (287 ppm Pt based pm siloxane) and the reaction mixture was stirred and heated. At 89° C. hydrogen evolution was observed. The mixture was heated for 2 hours at 150° C. and then another 3.05 mg of the catalyst was added (596 ppm total Pt) and heated at 150° C. for another hour. The brown liquid was cooled, filtered, stripped on a rotary evaporator and then vacuum stripped. There was recovered 10.5 g of a tacky, viscous brown clear liquid. Yield was about 85% of theory of the polysiloxane, containing the sterically hindered piperidinoxy moiety (PIP), of Formula IX wherein all of the R''' groups are methyl groups, the R' of the Y group is hydrogen and the R group of the Y group are all methyl groups.

Experiment 3

A 200 ml reactor equipped as described in Experiment 1 was charged with 44.94 g of $MD_{15}D_5'M'$, 23.55 g of 2,2,6,6-tetramethyl-4-piperidinol, 29.35 g of xylene and 34.02 mg of the same platinum catalyst used in Experiment 1 (265 ppm Pt based on siloxane) and the mixture was stirred and heated at 100° C. for 5 hours; hydrogen evolution was observed. After standing overnight at room temperature under a nitrogen purge another 270–300 ppm of Pt was added and the reaction mixture was stirred at 140°–142° C. for about 4.5 hours. Small amounts of activated charcoal and filter aid were added, cooled with stirring, stripped on a rotary evaporator at 60° C. at an aspirator vacuum for 1.5 hours, then at 0.1 mm Hg for 1 hour. The residual liquid was pressure filtered to yield a tan turbid liquid that was restripped on a vacuum pump for 1 hour at 30°–40° C. and 0.1 mm Hg and filtered to yield about 43.7 g of liquid. Yield was 65.1% of $MD_{15}D_5'M'$, the polysiloxane having the sterically hindered piperidinoxy moiety (PIP), wherein the R' of the Y group is hydrogen and all of the R groups are methyl groups.

Experiment 4

To the reactor described in Experiment 3 there were added 32.72 g of $MD_{10}D_5'M'$, 22.43 g of 2,2,6,6-tetramethyl-4-piperidinol, 23.64 g of xylene and 27.46 mg of the same platinum catalyst used in Experiment 1 (294 ppm Pt based on siloxane) and the mixture was stirred and heated at 100° C. for 5 hours; hydrogen evolution was observed. After standing overnight at room temperature under a nitrogen purge another 300 ppm Pt was added and the reaction mixture was stirred and heated at 145° C. for about 5.25 hours. Small amounts of activated charcoal and filter aid were added and stirred to cool to room temperature. The reaction mixture was stripped on a rotary evaporator at 55°–60° C. under aspirator vacuum for 2 hours, then at 0.1 mm Hg for 1 hour at 30° C. The residual liquid was pressure filtered to yield 35.1 g of liquid. Yield was 65.3% of $MD_{10}D_5^*M'$, the polysiloxane having the sterically hindered piperidinoxy moiety (PIP), wherein the R' of the Y group is hydrogen and all of the R groups are methyl groups.

Experiment 5

A 100 ml reactor equipped as described in Experiment 1 was charged with 19.22 g of $MD_5D_5'M'$, 19.03 g of 2,2,6,6-tetramethyl-4-piperidinol, 16.39 g of xylene and 16.45 mg of the same platinum catalyst used in Experiment 1 (300 ppm Pt based on siloxane) and the mixture was stirred and heated at 100° C. for 5 hours; hydrogen evolution was observed. After standing overnight at room temperature under a nitrogen purge another 300 ppm Pt was added and the reaction mixture was stirred and heated at 140°–143° C. for about 5 hours. Added another 150 ppm Pt, continued the reaction another 1.5 hours; then, while cooling, added small amounts of activated charcoal and filter aid. The reaction mixture was stripped on a rotary evaporator at 60° C. under aspirator vacuum for 1.25 hours. The residual liquid was pressure filtered to yield 23.7 g of clear tan liquid. Yield was 63.8% of $MD_5D_5^*M'$, the polysiloxane, having the sterically hindered piperidinoxy moiety (PIP), wherein the R' of the Y group is hydrogen and all of the R groups are methyl groups.

Experiment 6

To the reactor described in Experiment 5 there were added 26.84 g of $MD_y'M'$, 19.92 g of 2,2,6,6-tetramethyl-4 piperidinol, 20.04 g of xylene and 20.44 mg of the same platinum catalyst used in Experiment 1 (267 ppm Pt based on siloxane) and the mixture was stirred and heated. At about 80°–85° C. the mixture was brown with gas evolution observed. At 140° C. the mixture went to a black-brown color and heating was continued at 138°–140° C. for 3.5 hours. Cooled to room temperature, added small amounts of activated charcoal and filter aid and filtered to obtain a clear light tan liquid. Stripped at aspirated vacuum on a rotary evaporator to 45°–50° C. and then to 1 mm Hg at 45°–50° C. The product became white opaque and was filtered to yield a clear light tan liquid. Upon standing a solid phase separated out, the mixture was filtered and then distilled at 101° C. at 1 mm Hg to yield 28.3 g of water white liquid. Yield was 62.1% of $MD_y^*M'$, the polysiloxane, having the sterically hindered piperidinoxy moiety (PIP), wherein the R' of the Y group is hydrogen and all of the R groups are methyl groups, and y has an average value of about 1.

Experiment 7

A 250 ml reactor equipped as described in Experiment 1 was charged with 41.84 g of $M''D_4'M''$ of the formula:

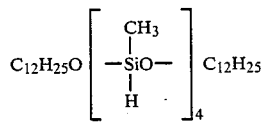

37.01 g of 2,2,6,6 tetramethyl-4-piperidinol, 33.79 g of xylene and 35.9 mg of the same platinum catalyst used in Experiment 1 (300 ppm Pt based on siloxane) and the mixture was heated at reflux for 1.5 to 2 hours; hydrogen evolution was observed. Added another 336 ppm Pt, continued the reaction 1 hour at 140° C. and let stand overnight at room temperature under nitrogen. Small amounts of activated charcoal and filter aid were added and filtered to obtain a clear tan liquid. Stripped at aspirated vacuum in a rotary evaporator at 50° C., then at 50° C. and 1 mm Hg to yield a turbid liquid that was pressure filtered to give 54.1 g of clear tan liquid. Yield was 70.6% of the sterically polysiloxane, having the hindered piperidinoxy moiety (PIP), of the general formula $M''D_4^*M''$.

Experiment 8

To the reactor described in Experiment 7 there were added 57.99 g of $M''D_4D_4'M''$ of the formula:

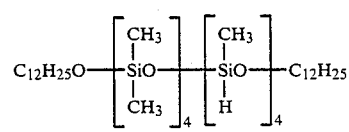

40.14 g of 2,2,6,6-tetramethyl-4-piperidinol, 42.06 g of xylene and 51.5 mg of the same catalyst used in Experiment 1 (311 ppm Pt based on siloxane). At about 40° C. hydrogen evolution was observed, stirred at reflux for 4.5 hours and cooled overnight under nitrogen. Small amounts of activated charcoal and filter aid were added and pressure filtered. Stripped at aspirated vacuum on a rotary evaporator at 45°–50° C. and then at 50° C. at 1 mm Hg. The tan liquid was filtered to yield 75.84 g of the polysiloxane, having the sterically hindered piperidinoxy moiety (PIP), of the general formula $M''D_4D_4^*M''$; yield was 79.2%.

Experiment 9

In a manner similar to that described in Experiment 5 a mixture of 66.98 g of $MD_5M_5'M'$ of the formula:

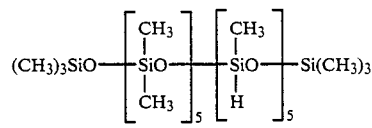

68.19 g of 2,2,6,6-tetramethyl-4-piperidinol, 57 93 g of xylene and 57.9 mg of the same platinum catalyst (303 ppm Pt based on siloxane) was refluxed for 1.5 hours. Then an additional 150 ppm Pt was added and continued refluxing for 2 hours. Added small amounts of activated charcoal and filter aid, cooled and pressure filtered. The tan liquid was desolvated on the rotary evaporator to 50° C. at aspirated vacuum then at pump vacuum to 45°–50° C. at 1 mm Hg and refiltered to give 84.5 g of clear tan liquid. Yield was 64% of the polysiloxane, having the sterically hindered piperidinoxy moiety (PIP), of the general formula $MD_5D_5^8M'$.

Experiment 10

In a manner similar to that described in Experiment 4 a mixture of 71.83 g of $MD_{10}D_5'M'$ of the general formula:

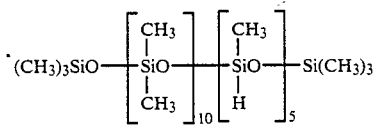

50.04 g of 2,2,6,6-tetramethyl-4-piperidinol, 52.23 g of xylene and 61.81 mg of the same platinum catalyst (301 ppm Pt based on siloxane) was refluxed for about 3 hours and then left standing overnight under nitrogen. After adding an additional 100 ppm Pt and refluxing for about 2 hours, small amounts of activated charcoal and filter aid were added and the mixture was cooled and pressure filtered. The tan liquid was desolvated at 50° C. on the rotary evaporator at aspirated vacuum then at pump vacuum at 50° C. at 1 mm Hg and filtered to give 80.1 g of clear, slightly tan liquid. Yield was 67% of the polysiloxane, having the sterically hindered piperidinoxy moiety (PIP), of the general formula $MD_{10}D_5^*M'$.

Experiment 11

In a manner similar to that described in Experiment 3 a mixture of 100.63 g of $MD_{15}D_5'M$ of the general formula:

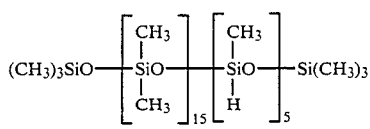

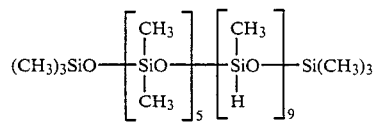

52.74 g of 2,2,6,6-tetramethyl-4-piperidinol, 65.73 g of xylene and 88.93 mg of the same platinum catalyst (309 ppm Pt based on siloxane) was refluxed for 4.5 hours and then left standing overnight under nitrogen. After adding an additional 100 ppm Pt and refluxing for 2 hours, activated charcoal and filter and were added and the mixture was cooled and pressure filtered. The tan liquid was desolvated on the rotary evaporator at aspirated vacuum at 50° C. then at pump vacuum at 45°–50° C. at 1 mm Hg and filtered to give 108.6 g of clear, very slightly tan liquid. Yield was 72% of the polysiloxane, having the sterically hindered piperidinoxy moiety of the general formula $MD_{15}D_5{}^*M'$.

Experiment 12

In a manner similar to that described in of xylene and 54.88 mg of the same platinum catalyst (303.6 ppm Pt based on siloxane) was refluxed for about 4.5 hours and then left standing overnight under nitrogen. In the morning added 1.33 g of 2,2,6.6 tetramethyl 4-piperidinol and refluxed for 2 hours. Added activated charcoal and filter aid, cooled and pressure filtered. The tan liquid was desolvated on the rotary evaporator at aspirated vacuum at 50° C. then at pump vacuum at 50° C. at 1 mm Hg. The mixture was pressure filtered to give 84.7 g of clear, slightly tan liquid. Yield was 72.7% of the polysiloxanes, having the sterically hindered piperidinoxy moiety (PIP), of the general formula $M''D_4{}^*M''$.

Experiment 13

In a manner similar to that described in Experiment 8, 78.53g of $M''D_4D_4'M''$, 54.36 g of 2,2,6,6-tetramethyl-4 piperidinol, 56.75 g of xylene and 67.64 mg of the same platinum catalyst (301 ppm Pt based on siloxane) was refluxed for about 4–5 hours and then left standing overnight under nitrogen. Added another 150 ppm Pt, refluxed for 2.5 hours, added activated charcoal and filter aid, cooled and pressure filtered. The dark tan clear liquid was desolvated on the rotary evaporator at aspirated vacuum at 50° C. and then at pump vacuum at 50° C. at 1 mm Hg for 2 hours. The mixture was filtered to give 99.7 g of clear tan liquid. Yield was 76.5% of the polysiloxane having the sterically hindered piperidinoxy moiety (PIP), of the general formula $M''D_4D_4{}^*M''$.

Experiment 14

To the reactor similar to that described in Experiment 1 there were charged 63.6 g of toluene, 19.3 g of 2,2,6,6-tetramethyl-4-piperidinol and two potassium hydroxide pellets and the mixture was refluxed to azeotropically remove any water present. Over a 15 minutes period at a temperature of 80°–90° C. 18.58 g of $MD_5D_9'M'$ of the formula:

was added in a dropwise manner and the mixture was stirred an additional hour. The mixture was cooled and neutralized, first with sodium acetate and followed by potassium carbonate, and stirred overnight. The toluene was stripped under vacuum to 110° C. pot temperature and the liquid residue was pressure filtered hot to give 26 g of colorless product. Yield was 70% of the polysiloxane, having the sterically hindered piperidinoxy moiety (PIP), of the general formula $MD_5D_9{}^*M''$.

Experiment 15

To the reactor similar to that described in Experiment 5 there were charged 157.25 g of 2,2,6,6-tetramethyl-4-piperidinol and 15 87 g of xylene and azeotropically distilled at about 165° C. to remove water present. Cooled to 104° C. and slowly (15 minutes) added 76.3g of $MD'_{10}M'$ of the formula:

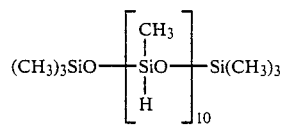

after having added 8 ml of xylene and 10.58 mg of the same platinum catalyst (100 ppm Pt based on siloxane). The temperature was gradually raised to 130° C. and the reaction was continued overnight at 128° C. Added activated charcoal and filter and, cooled pressure filtered. The filtrate was desolvated on the rotary evaporator at 80° C. at aspirated vacuum and then at pump vacuum at 100° C. at 1 mm. Hg. The mixture was filtered and 26.4 g of light tan liquid was precovered. Yield was 76.4% of the polysiloxane, having the sterically hindered piperidinoxy moiety (PIP), of the general formula $MD^*{}_{10}M'$.

Experiment 16

Following the procedure similar to that of Experiment 15, 113.45 g of $MD_5D'_{10}M$ of the structure

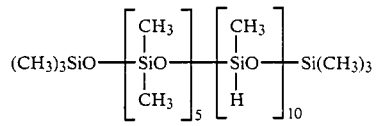

and 157.25 g of 2,2,6,6-tetramethyl-4-piperidinol were reacted in about 18 g of xylene using 12.21 mg the same platinum catalyst (100 ppm based on siloxane). After stirring overnight at 140° C. the product was recovered as a light brown liquid, 29.8 g . Yield was 73.8% of the polysiloxane, having the sterically hindered piperidinoxy moiety (PIP), of the general formula $MD_5D^*{}_{10}M'$.

Experiment 17

Following the procedure similar to that of Experiment 15, 95.67 of $MD_5D'_{15}M'$ of the structure:

$$(CH_3)_3SiO \left[ \begin{array}{c} CH_3 \\ | \\ SiO \\ | \\ CH_3 \end{array} \right]_5 \left[ \begin{array}{c} CH_3 \\ | \\ SiO \\ | \\ H \end{array} \right]_{15} Si(CH_3)_3$$

and 157.25 g of 2,2,6,6-tetramethyl-4-piperidinol were reacted with about 18 g of xylene using 11.85 mg of the same platinum catalyst (100 ppm Pt based on siloxane). After stirring overnight at 128° C. the product was recovered as a light brown liquid, 31.5 g . Yield was 80.7% of the polysiloxane, having the sterically hindered moiety (PIP), Experiment 18

Using a 250 ml reactor and following the procedure similar to that of Experiment 15, 150.53 g of $MD_{10}D'_{10}M'$ of the structure:

$$(CH_3)_3SiO \left[ \begin{array}{c} CH_3 \\ | \\ SiO \\ | \\ CH_3 \end{array} \right]_{10} \left[ \begin{array}{c} CH_3 \\ | \\ SiO \\ | \\ H \end{array} \right]_{10} Si(CH_3)_3$$

and 157.25 g of 2,2,6,6-1-tetramethyl-4-piperidinol were reacted with about 20.3 g of xylene using 13.56 mg of the same platinum catalyst (100 ppm based on siloxane). After stirring overnight at 130°-135° C. the product was recovered as a light gold liquid, 31g. Yield was 67.% of the polysiloxane, having the sterically hindered piperidinoxy moiety (PIP), of the general formula $MD_{10}D*_{10}M'$.

What we claim is:

1. An olefin polymer composition comprising an olefin polymer and a stabilizing amount, sufficient to stabilize said olefin polymer against light degradation, of a polysiloxane stabilizer of the formula:

$$M*_vD_xD*_yT_zQ_wM*_v$$

wherein: M* represents a member of the group, M, M', or M" in which $M = R^u{}_3SiO—;$ $M' = R^u{}_3Si—;$ and $M'' = R''O_{\frac{1}{2}}—;$ $R^u$ is an alkyl group having 1 to 8 carbon atoms, phenyl, or phenethyl;

$R''$ is an alkyl group having 2 to 20 carbon atoms or a phenyl group;

$$D = \begin{array}{c} R \\ | \\ -SiO- \\ | \\ R \end{array}$$

R is phenyl or an alkyl group having 1 to 3 carbon atoms;

$$D* = \begin{array}{c} R^u \\ | \\ -SiO- \\ | \\ X \\ | \\ Y' \\ | \\ Z \\ (CH_2)_p \diagdown \diagup R' \\ R \diagup \diagdown \diagup \diagdown R \\ \phantom{R} N \phantom{R} \\ \phantom{RR} | \phantom{RR} \\ \phantom{RRR} R''' \end{array}$$

R' is hydrogen, an alkyl groups having 1 to 3 carbon atoms, or a keto oxygen;

X is a single bond or $—C_nH_{2n}—,$ $—C_nH_{2n}OC_mH_{2m}—$ $—C_nH_{2n-1}\text{-cyclohexyl-OH}$, or $—C_nH_{2n}OC_mH_{2m-1}(OH)—;$ R''' is hydrogen or an alkyl group having 1 to 12 carbon atoms;

Y' is —O—, —COO—, —$C_nH_{2n}$O—, or —NH—;

Z is CH or nitrogen with the proviso that when Z is nitrogen, Y' is —$C_nH_{2n}$O—;

y has a value of 1 to about 100;

n has a value of zero to about 10;

m has a value of zero to about 10;

p has a value of zero or one;

$$T = \begin{array}{c} R \\ | \\ -SiO_{3/2}- \\ | \end{array}$$

$$Q = \begin{array}{c} | \\ -SiO_{4/2}- \\ | \end{array}$$

v has a value of one;

x has a value of zero to about 200;

y has a value of about 1 to about 100;

z has a value of zero to about 5;

w has a value of zero to about 5.

2. An olefin polymer composition as claimed in claim 1 wherein the stabilizer is a polysiloxane of the formula:

$MD_xD*_yT_zQ_wM'$

3. An olefin polymer composition as claimed in claim 1 wherein the stabilizer is a olysiloxane of the formula:

$M''D_xD*_yT_zQ_wM''$

4. An olefin polymer composition as claimed in claim 1, wherein said polysiloxane stabilizer is added at a concentration of from about 0.005 percent to about 2 percent by weight, based on olefin polymer.

5. An olefin polymer composition as claimed in claim 1, wherein said polysiloxane stabilizer is added at a concentration of from about 0.05 percent to about 0.3 percent by weight, based on olefin polymer.

6. An olefin polymer composition as claimed in claim 1, wherein said olefin polymer is polyethylene.

7. An olefin polymer composition as claimed in claim 1, wherein said olefin polymer is polypropylene.

8. An olefin polymer composition as claimed in claim 1, wherein said olefin polymer is an ethylene copolymer.

9. An olefin polymer composition as claimed in claim 1, wherein said olefin polymer is a propylene copolymer.

10. An olefin polymer composition as claimed in claim 1 wherein the stabilizer is a polysiloxane of the formula:

$$MD_{lx}D^*_yM'$$

11. An olefin polymer composition as claimed in claim 1 wherein the stabilizer is a polysiloxane of the formula:

$$M''D_xD^*_yM''$$

12. An olefin polymer composition as claimed in claim 1 wherein $R^u$, R, R', and R''' are methyl.

13. An olefin polymer composition as claimed in claim 2 wherein $R^u$, R, R', R'' and R''', are methyl.

14. An olefin polymer composition as claimed in claim 3 wherein $R^u$, R, R', R'' and R''', are methyl.

15. An olefin polymer composition, as claimed in claim 10 wherein $R^u$, R, R', and R''', are methyl.

16. An olefin polymer composition as claimed in claim 11 wherein $R^u$, R, R', R'' and R''', are methyl.

17. An olefin polymer composition as claimed in claim 1 wherein $R^u$ is an alkyl group having 1 to 3 carbon atoms; R'' is an alkyl group having 12 to 18 carbon atoms; R' is hydrogen; R''' is hydrogen; Y, is —O—; Z is CH; x is a single bond; p has a value of 1; x has a value of from about 1 to about 20; y has a value of from about 1 to about 20; and z and w are zero.

18. An olefin polymer composition as claimed in claim 1 wherein X is $-C_nH_{2n}-$.

19. An olefin polymer composition as claimed in claim 10 wherein x and y each have a value of from about 1 to about 20.

20. An olefin polymer composition as claimed in claimed 11 wherein x and y each have a value of from about 1 to about 20.

21. An olefin polymer composition as claimed in claim 19 wherein $R^u$, R, R', and R'', are metyl.

22. An olefin polymer composition as claimed in claim 20 wherein $R^u$, R, R', R'' and R''' are metyl.

23. An olefin polymer composition as claimed in claim 10 wherein said polysiloxane is of the structure.

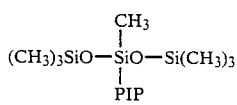

wherein PIP is:

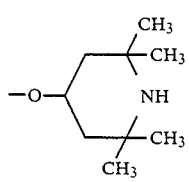

24. An olefin polymer composition comprising an olefin polymer and a stabilizing amount, sufficient to stabilize said olefin polymer against light degradation, of a polysiloxane of the formula:

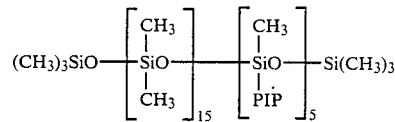

wherein PIP is as defined in claim 23.

25. An olefin polymer composition comprising an olefin polymer and a stabilizing amount, sufficient to stabilize said olefin polymer against light degradation, of a polysiloxane of the formula:

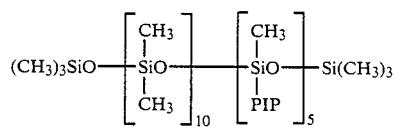

wherein PIP is as defined in claim 23.

26. An olefin polymer composition comprising an olefin polymer and a stabilizing amount, sufficient to stabilize said olefin polymer against light degradation, of a polysiloxane of the formula:

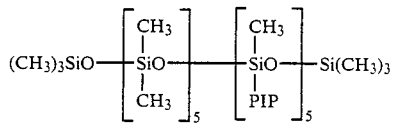

wherein PIP is as defined in claim 23.

27. An olefin polymer composition comprising an olefin polymer and a stabilizing amount, sufficient to stabilize said olefin polymer against light degradation, of a polysiloxane of the formula:

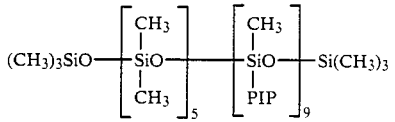

wherein PIP is as defined in claim 23.

28. An olefin polymer composition comprising an olefin polymer and a stabilizing amount, sufficient to stabilize said olefin polymer against light degradation, of a polysiloxane of the formula:

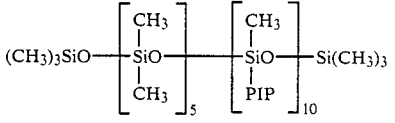

wherein PIP is as defined in claim 23.

29. An olefin polymer composition comprising an olefin polymer and a stabilizing amount, sufficient to stabilize said olefin polymer against light degradation, of a polysiloxane of the formula:

$$(CH_3)_3SiO\left[\begin{array}{c}CH_3\\|\\SiO\\|\\CH_3\end{array}\right]_5\left[\begin{array}{c}CH_3\\|\\SiO\\|\\PIP\end{array}\right]_{15}Si(CH_3)_3$$

wherein PIP is as defined in claim 23.

30. An olefin polymer composition comprising an olefin polymer and a stabilizing amount, sufficient to stabilize said olefin polymer against light degradation, of a polysiloxane of the formula:

$$(CH_3)_3SiO\left[\begin{array}{c}CH_3\\|\\SiO\\|\\PIP\end{array}\right]_{10}Si(CH_3)_3$$

wherein PIP is as defined in claim 23.

31. An olefin polymer composition comprising an olefin polymer and a stabilizing amount, sufficient to stabilize said olefin polymer against light degradation, of a polysiloxane of the formula:

$$(CH_3)_3SiO\left[\begin{array}{c}R\\|\\SiO\\|\\R\end{array}\right]_{10}\left[\begin{array}{c}R\\|\\SiO\\|\\PIP\end{array}\right]_{10}Si(CH_3)_3$$

wherein PIP is as defined in claim 23.

32. An olefin polymer composition comprising an olefin polymer and a stablizing amount, sufficient to stabilize said olefin polymer against light degradation, of a polysiloxane of the formula:

$$C_{12}H_{25}O\left[\begin{array}{c}CH_3\\|\\SiO\\|\\PIP\end{array}\right]_4 C_{12}H_{25}$$

wherein PIP is as defined in claim 23.

33. An olefin polymer composition comprising an olefin polymer and a stabilizing amount, sufficient to stabilize said olefin polymer against light degradation, of a polysiloxane of the formula:

$$C_{12}H_{25}O\left[\begin{array}{c}CH_3\\|\\SiO\\|\\CH_3\end{array}\right]_4\left[\begin{array}{c}CH_3\\|\\SiO\\|\\PIP\end{array}\right]_4 C_{12}H_{25}$$

wherein PIP is as defined in claim 23.

34. An olefin polymer composition comprising an olefin polymer and a stabilizing amount, sufficient to stabilize said olefin polymer against light degradation, of a polysiloxane of the formula:

[cyclic tetrasiloxane structure with Si—O—Si—O—Si—O—Si ring, each Si bearing R and Y substituents]

wherein
Y is the group:

$$-Y'-Z\begin{array}{c}R'\\\diagup\\\diagdown\\(CH_2)_p\end{array}\begin{array}{c}R\\\diagup\\N-R'''\\\diagdown\\R\end{array}$$

wherein
Y' is —O—, —COO—, —$C_nH_{2n}$O—, or —NH—;
Z is CH or nitrogen, with the proviso that when Z is nitrogen, Y'' is —$C_nH_{2n}$O—;
R is phenyl or an alkyl group having 1 to 3 carbon atoms;
R' is hydrogen, an alkyl group having 1 to 3 carbon atoms, or a keto oxygen;
R''', is hydrogen or an alkyl group havig 1 to 12 carbon atoms; and
p has a value of zero or one.

35. An olefin polymer composition as claimed in claim 10 wherein x is zero.

36. An olefin polymer composition as claimed in claim 11 wherein x is zero.

37. An olefin polymer composition as claimed in claim 34 wherein R is methyl.

38. An olefin polymer composition as claimed in claim 1 wherein said polymer is an ethylene/hexene-1 copolymer.

39. An olefin polymer composition as claimed in claim 1 wherein said polymer is an ethylene/butene-1 copolymer.

40. An olefin polymer composition as claimed in claim 1 wherein said polymer is an ethylene/pyopylene copolymer.

41. An olefin polymer composition as claimed in claim 1 wherein said polymer is an ethylene/propylene/hexene-1 terpolymer.

42. An olefin polymer composition as claimed in claim 1 wherein said polymer is an ethylene/butene-1/hexene-1 terpolymer.

43. An olefin polymer composition as claimed in claim 1 wherein said polymer is an ethylene/propylene/butadiene terpolymer.

44. An olefin polymer composition as claimed in claim 1 wherein said polymer is an ethylene/propylene/dicyclopentadiene terpolymer.

45. An olefin polymer composition as claimed in claim 1 wherein said polymer is an ethylene/propylene/hexadiene terpolymer.

46. An olefin polymer composition as claimed in claim 1 wherein said polymer is an ethylene/propylene/ethylidene norbornene terpolymer.

47. An olefin polymer composition as claimed in claim 1 wherein said polymer is an ethylene/ethylidene norbornene copolymer.

* * * * *